US011858787B2

(12) United States Patent
Karbassi

(10) Patent No.: US 11,858,787 B2
(45) Date of Patent: Jan. 2, 2024

(54) SYSTEMS AND METHODS FOR OPERATING A DIRECT CURRENT HYDRAULIC PUMP

(71) Applicant: Kar-Tech, Inc., Delafield, WI (US)

(72) Inventor: Hassan Karbassi, Delafield, WI (US)

(73) Assignee: Kar-Tech, Inc., Delafield, WI (US)

( * ) Notice: Subject to any disclaimer, the term of this patent is extended or adjusted under 35 U.S.C. 154(b) by 151 days.

(21) Appl. No.: 17/532,213

(22) Filed: Nov. 22, 2021

(65) Prior Publication Data

US 2022/0081261 A1 Mar. 17, 2022

Related U.S. Application Data

(63) Continuation-in-part of application No. 15/889,854, filed on Feb. 6, 2018, now Pat. No. 11,181,126.

(51) Int. Cl.

| | |
|---|---|
| ***B66C 13/44*** | (2006.01) |
| ***B66C 23/00*** | (2006.01) |
| ***B66C 13/12*** | (2006.01) |

(52) U.S. Cl.
CPC .............. *B66C 13/44* (2013.01); *B66C 13/12* (2013.01); *B66C 23/54* (2013.01)

(58) Field of Classification Search
CPC ......... B66C 13/20; B66C 13/22; B66C 13/44; F15B 2211/6346; F15B 11/0423
See application file for complete search history.

(56) References Cited

U.S. PATENT DOCUMENTS

| | | | |
|---|---|---|---|
| 7,506,505 B2 | 3/2009 | Fushimi | |
| 8,587,228 B2 | 11/2013 | Anderson | |
| 9,206,667 B2 | 12/2015 | Khvoshchev et al. | |
| 9,447,563 B2 * | 9/2016 | Ikegami .................. | E02F 3/435 |
| 9,816,252 B2 | 11/2017 | Hoshino et al. | |
| 2011/0192695 A1 | 8/2011 | Lundstrom | |
| 2012/0132394 A1 | 5/2012 | Oberti et al. | |
| 2016/0207420 A1 | 7/2016 | Nilsson et al. | |
| 2017/0184092 A1 | 6/2017 | Bublitz et al. | |
| 2018/0143625 A1 * | 5/2018 | Nelson ...................... | E02F 9/26 |

OTHER PUBLICATIONS

USPTO, Non-final office action for U.S. Appl. No. 15/889,854, dated Mar. 13, 2020, 7 pages.
USPTO, Final office action for U.S. Appl. No. 15/889,854, dated Nov. 17, 2020, 8 pages.
USPTO, Final office action for U.S. Appl. No. 15/889,854, dated Feb. 8, 2021, 7 pages.
USPTO, Non-final office action for U.S. Appl. No. 15/889,854, dated Apr. 28, 2021, 8 pages.

* cited by examiner

*Primary Examiner* — Abiy Teka
(74) *Attorney, Agent, or Firm* — Smith Keane LLP

(57) ABSTRACT

System and methods for a DC powered hydraulic system capable of providing control over pressurized hydraulic fluid delivered to directional valves without the need for a PTO and/or a proportional valve. The hydraulic system controls the output from a battery to a direct current hydraulic pump.

5 Claims, 5 Drawing Sheets

SYSTEMS AND METHODS FOR OPERATING A DIRECT CURRENT HYDRAULIC PUMP

BACKGROUND OF THE INVENTION

Hydraulic systems for use in lifting or pushing systems (e.g., cranes, dump trucks, garbage trucks, snow plows, etc.), are typically systems in which a hydraulic pump is driven via a direct current (DC) power supply or a power take off (PTO) from a motor vehicle (e.g., a truck or tractor), to provide a constant, non-variable pressure at the output of the hydraulic fluid pump.

In an electrically driven system, pressurized hydraulic fluid from the hydraulic pump is provided directly to directional valves, wherein each directional valve controls the flow of pressurized hydraulic fluid to a hydraulic control cylinder (e.g., to control crane boom extension/retraction, boom rotation, boom up/down, etc.). When in operation, such system relies on electrical power, such as power from a vehicle battery or battery bank, to maintain pressure within the hydraulic pump at all times. This requirement, however, is not optimal because the pressure in the system is maintained even when there may be no demand to operate any of the hydraulic cylinders, thus draining the batteries prematurely and causing component (e.g., battery or solenoid switching) failure. Additionally, when a directional valve is operated, the valve opens and closes under the full load of the pressure provided by the pump, which increases wear on the system's parts as the hydraulic cylinders are activated and deactivated in an on/off or "bang-bang" manner.

In a mechanically driven mobile hydraulic pump system, the pressurized fluid from the hydraulic pump is provided first to a proportional valve and then to directional valves. Thus, because the output of the hydraulic pump is constant, the proportional valve is used to throttle the pressure prior to delivering hydraulic fluid to the directional valves. This decreases the wear on the system because it provides control of the pressurized hydraulic fluid, but it requires the installation of a PTO system.

Therefore, there is a need for a hydraulic system having enhanced modulation capable of providing control over pressurized hydraulic fluid delivered to directional valves without the need for a PTO and/or a proportional valve.

SUMMARY OF THE INVENTION

The present invention relates to a DC powered hydraulic system capable of providing control over pressurized hydraulic fluid delivered to directional valves without the need for a PTO and/or a proportional valve. The proposed system providing controllable hydraulic pump output to all directional valves through the operation of a DC motor driving a hydraulic pump.

One aspect of the present invention is to provide a controller for operating a hydraulic system with an axis of operation, a battery with a battery output, and a direct current (DC) hydraulic pump, wherein the controller comprises an axis switch in operative communication with the axis of operation in the hydraulic system; and a trigger switch configured to control the battery output to the DC hydraulic pump.

The hydraulic system may have a receiver and the controller may further comprise a transmitter configured to transmit the position of the axis switch and the position of the trigger switch to the receiver of the hydraulic system. The axis switch may be a two-way momentary switch, and the trigger switch may be a variable speed switch.

Another aspect of the present invention is to provide a hydraulic system comprising a machine with an axis of operation; a directional valve operatively connected to the axis of operation; a direct current (DC) hydraulic pump operatively connected to the directional valve; a controller; a battery with a battery output; and a command center in electrical communication with the hydraulic pump, the controller, and the battery; whereby the controller communicates with the command center, operation of the directional valve and the battery output to the hydraulic pump.

The controller may further comprise an axis switch and a trigger switch, both may be configured to be in communication with the command center, whereby operation of the axis switch corresponds to the operation of the directional valve and operation of the trigger switch corresponds to the battery output provided to the hydraulic pump.

Both the axis switch and the trigger switch may be required to be closed prior to the operation of the axis of operation. The axis switch may be a two-way momentary switch, and the trigger switch may be a variable-speed switch.

The battery output provided to the pump may be within a predetermined range and determined by the position of the trigger switch. The predetermined current output range may be customizable through a graphic user interface of an electronic device. A ramp-rate of battery output provided to the pump may be predetermined and the ramp-rate of battery output may be customizable through a graphic user interface of an electronic device.

The controller may communicate to the command center wirelessly.

Another aspect of the present invention includes a method of operating an axis of operation on a machine comprising the steps of providing a directional valve operatively connected to the axis of operation; providing a direct current (DC) hydraulic pump operatively connected to the directional valve; providing a battery with a battery output; activating the directional valve; delivering the battery output to the DC hydraulic pump, wherein the battery output is variable.

The method may further comprise the steps of providing a controller; providing a command center in electrical communication with the hydraulic pump, the controller, and the battery; delivering a command from the controller to the command center to activate the directional valve; and delivering a command from the controller to the command center to provide battery output to the DC hydraulic pump.

The controller used in the method may further comprise an axis switch and a trigger switch, both configured to be in communication with the command center, whereby operation of the axis switch corresponds to the operation of the directional valve and operation of the trigger switch corresponds to the battery output provided to the hydraulic pump.

Both the axis switch and the trigger switch may be required to be closed prior to the operation of the axis of operation. The axis switch may be a two-way momentary switch, and the trigger switch may be a variable-speed switch.

According to an aspect of another embodiment of a system according to the present invention, the system includes a handheld controller for operating a hydraulic system with an axis of operation, a battery with a battery output, and a direct current (DC) hydraulic pump, the handheld controller including a joystick configured to control the battery output to the DC hydraulic pump and the axis of operation of the hydraulic system. The handheld controller may include an emergency stop switch (e.g., pushbutton), the activation or deactivation of which causes the system to at least one of pause operation, shut down, and/or safely move to a retracted/safe position.

According to another aspect of another embodiment of a system according to the present invention, the system includes a receiver and the handheld controller is capable of transmitting an indication of a position of the joystick to the receiver of the hydraulic system, or the receiver is capable of detecting that joystick position, such transmission and/or detection occurring over a wired or wireless interface.

According to still another aspect of another embodiment of a system according to the present invention, the system includes a second axis of operation, the joystick being configured to control the battery output to the DC hydraulic pump and the second axis of operation of the hydraulic system. The system may further include a third axis of operation, and the handheld controller may further include a second joystick being configured to control the battery output to the DC hydraulic pump and the third axis of operation of the hydraulic system. Each joystick is preferably positionable along two axes of movement, each axis corresponding to a maximum of one directional valve of the hydraulic system, each joystick biased to a central home position. A predetermined movement of either joystick preferably activates the directional valve associated with that joystick. Movement of either joystick further from the central home position beyond the predetermined movement increases the hydraulic pressure of the hydraulic system. Movement of a joystick from a resting position for a predetermined range (e.g., an inactivity zone) about one axis will not vary the hydraulic pressure nor activate the associated directional valve.

According to an aspect of a further embodiment of a system according to the present invention, the system includes a machine with at least two axes of operation and at least two directional valves, wherein each directional valve is operatively connected to an axis of operation. The system also includes a direct current (DC) hydraulic pump operatively connected to the directional valves. A handheld controller having at least two bi-directional joysticks is in communication with a command center, which in turn is in electrical communication with a battery and the pump, such that the command center controls (or adjusts) the DC power supplied to the pump and also controls (activates and/or deactivates) the directional valves, preferably in response to communications (wired or wireless) received or detected from the controller, reflective of movement of the joysticks. Movement of a joystick about a single axis corresponds to the operation (activation) of one directional valve (in a predetermined direction) and effects a variation in the battery output (i.e., power provided to the DC pump).

According to another aspect of a further embodiment of a system according to the present invention, the battery output provided to the pump is within a predetermined range and is affected by at least one of movement of a first of the joysticks in a first direction; movement of the first joystick in a second direction, the second direction being orthogonal to the first direction; and movement of the first joystick in a third direction, the third direction being between the first direction and the second direction. Movement of the first joystick in the third direction causes the command center to generate and deliver an adjusted battery output to the pump.

According to still another aspect of a further embodiment of a system according to the present invention, the battery output provided to the pump is also affected by at least one of movement of a second of the joysticks in a first direction; movement of the second joystick in a second direction, the second direction being orthogonal to the first direction; and movement of the second joystick in a third direction, the third direction being between the first direction and the second direction.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
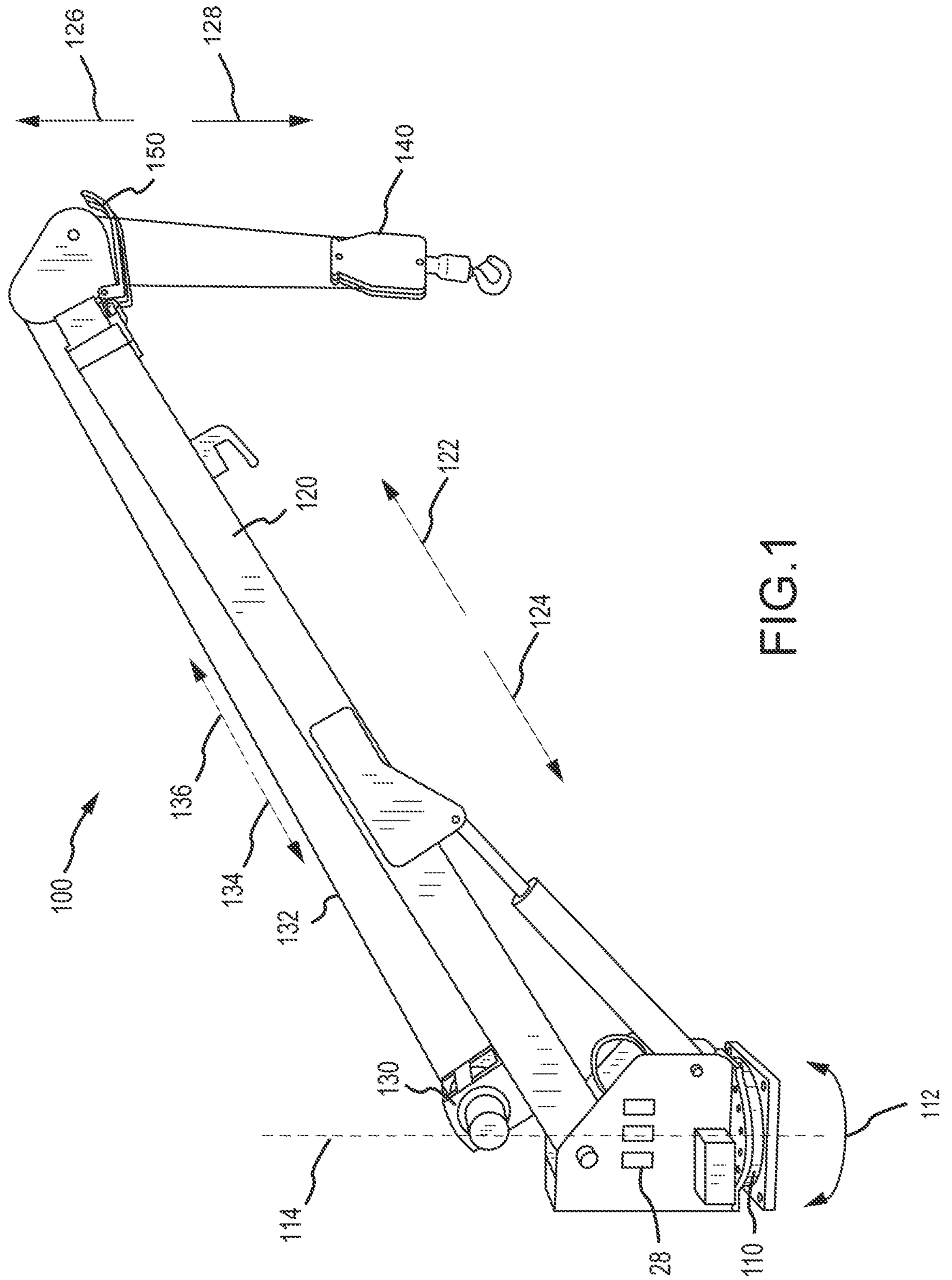
FIG. 1 is a side elevation view of a crane incorporating a hydraulic system according to the present invention.

FIG. 1 illustrates a mountable crane assembly 100 on which may be installed a hydraulic system 10 according to the present invention. In the example provided, the mountable crane assembly 100 may be mounted in the bed of a truck (not shown). It should be understood, however, that the discussion directed to the hydraulic system 10 with respect to the mountable crane assembly 100 is for illustrative purposes only, and that the hydraulic system 10 may be applied to various machines incorporating hydraulics, including, but not limited to, dump trucks, tractors, etc.

The crane assembly 100 comprises a slewing platform 110, a boom 120, and a winch 130 with winch cable 132. The slewing platform 110 allows the boom 120 to rotate 112 about a first axis 114, which may be a vertical axis relative to the ground; the boom 120 is configured to extend 122, retract 124, raise 126, and lower 128; and the winch cable 132 may be threaded through a gun tackle arrangement 140 and configured to be coupled to a payload (not shown) and raise and lower the payload relative to the crane assembly 100 by winding the winch cable 132 in 134 or letting the winch cable 132 out 136.

Figure 2:
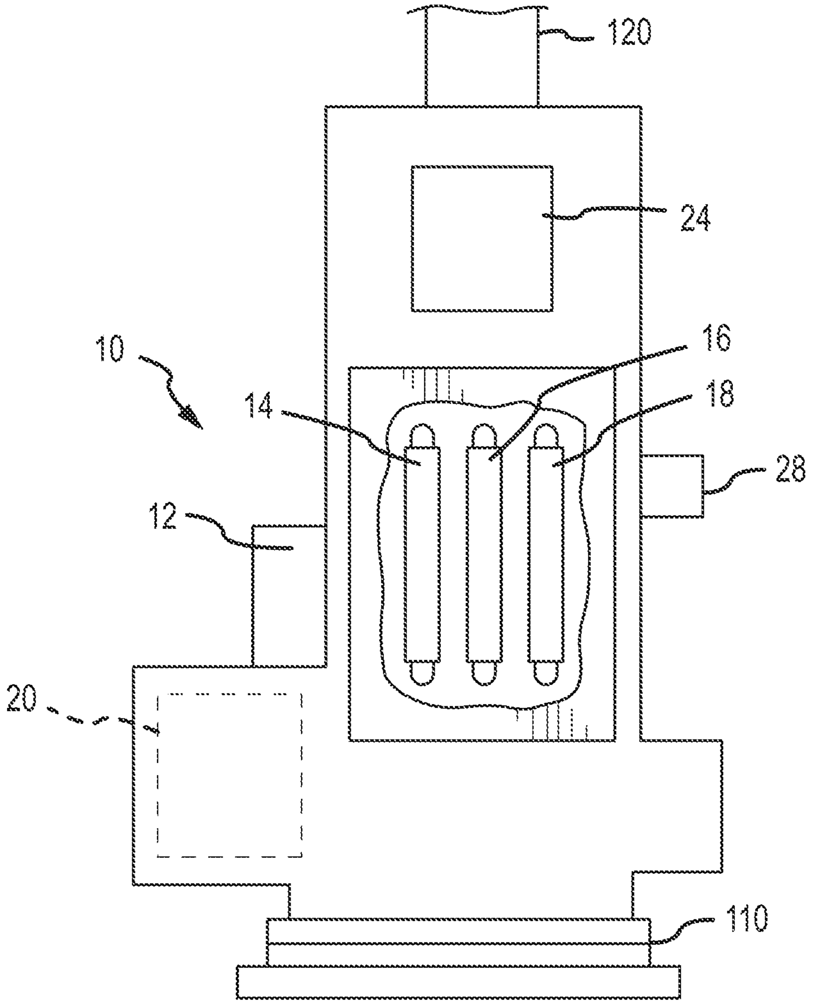
FIG. 2 is a side elevation view of the crane shown in FIG. 1.
Figure 3:
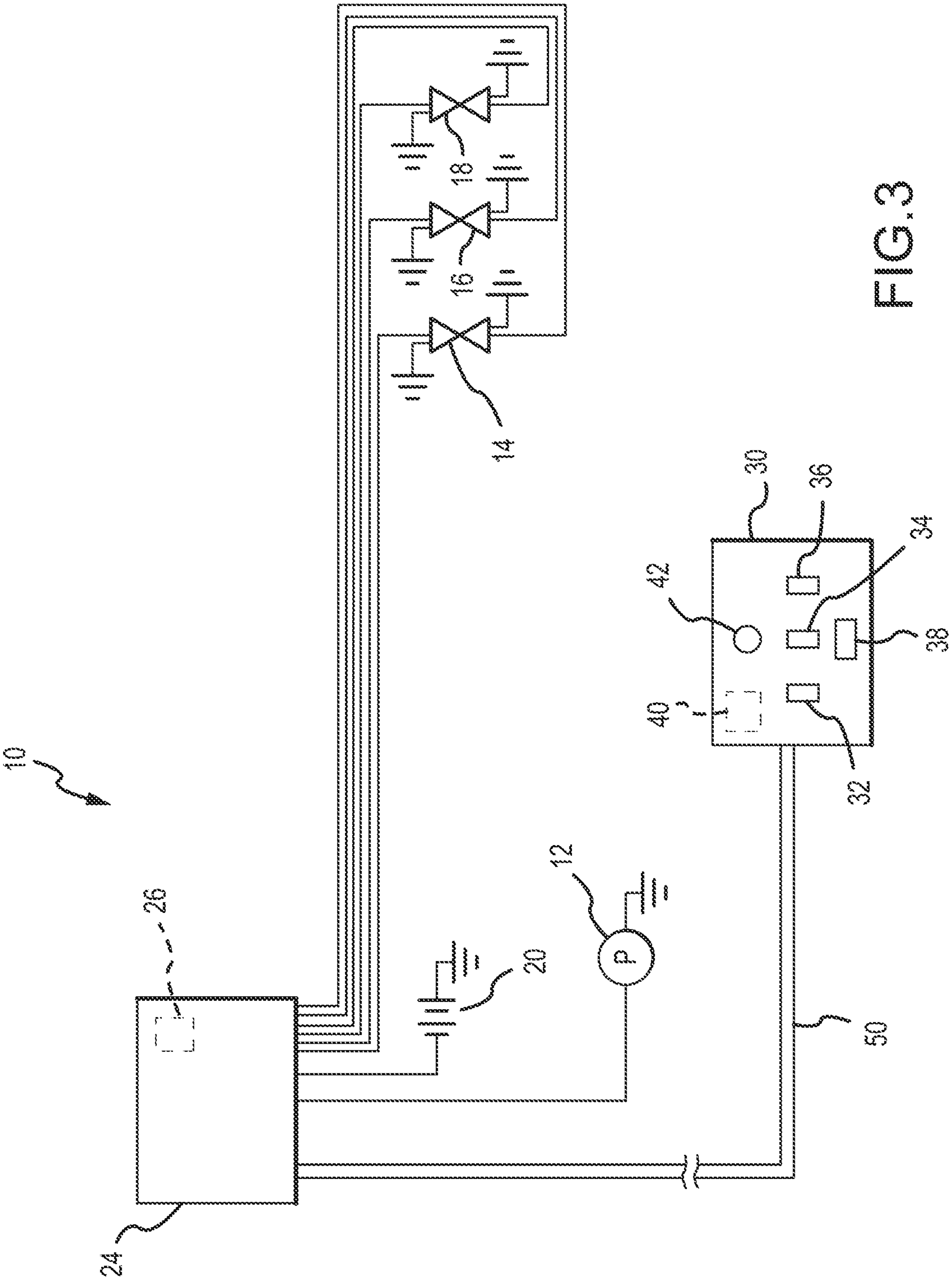
FIG. 3 is an electrical schematic of a first embodiment of the hydraulic system according to the present invention.

FIGS. 2 and 3 illustrate an exemplary embodiment of the hydraulic system 10 according to the present invention. The hydraulic system 10 preferably comprises a pump 12; a plurality of directional valves (here shown as a first directional valve 14, a second directional valve 16, and a third directional valve 18); a battery 20; a command center 24; and a relay 28. Preferably, each of the directional valves 14,16,18 is an electronically controlled directional valve having a fluid input (hidden) received from the pump 12, and fluid output (hidden) to direct hydraulic fluid to hydraulic cylinders to control operation of an individual axis movement (e.g., boom extension, boom rotation, boom vertical movement, etc.). An example of a directional valve which can be used within the present invention is a 12-volt DC, four-port, three-position directional control valve produced by Argo Hytos.

As stated earlier, while a three-cylinder (or 3-axis) system is described herein, it should be noted that the hydraulic system 10 according to the present invention may be implemented on systems involving more or less than three directional valves, with a valve provided for each axis operation. It is also contemplated that proportional valves (not shown) may be used in place of, in combination with, or in addition to the directional valves 14,16,18.

The command center 24 is preferably in electrical communication with the pump 12; the first, second, and third directional valves 14, 16, 18; the battery 20; and the relay 28. The command center 24 preferably receives commands from a handheld controller 30 (FIG. 3), described below, and outputs the commands to the pump 12 and the first, second, and third directional valves 14, 16, 18. The pump 12 is preferably in fluid communication with the directional valves 14,16,18.

Additionally or alternatively, other elements may be incorporated into the hydraulic system 10 and in electrical communication with the command center 24. For example, a horn (not shown), pressure switches (not shown) and limit switches 150 to indicate the operational limits of the axes, and additional relays (not shown) for the activation of other elements such as a manual override (not shown).

FIG. 3 illustrates a simplified schematic of the electrical elements of the hydraulic system 10 shown in FIG. 2 and further illustrates the handheld controller 30. According to the exemplary embodiment of the present invention described herein, the handheld controller 30 preferably comprises a first axis switch 32, a second axis switch 34, and a third axis switch 36; a trigger switch 38 (preferably capable of modulating a control signal); a transmitter 40; and an emergency stop switch 42. The handheld controller 30 is preferably configured to communicate wirelessly with a receiver 26 preferably incorporated within the command center 24. The communication may be provided via any now known or later developed wireless communication technology (e.g., BLUETOOTH® communication, radio frequency signals, wireless local area network communication, infrared communication, near field communications (NFC), etc.). Additionally, or alternatively, a cable 50 may be used to provide passage of electrical communication between the handheld controller 30 and the command center 24.

Preferably, the first, second, and third axis switches 32, 34, 36 are two-way momentary switches, with each assigned to one of the directional valves 14, 16, 18. Each two-way momentary switch 32, 34, 36 has a first position which closes a first circuit, a second position which closes a second circuit, and a neutral position in which the first and second circuits remain open.

The trigger switch 38 is preferably a variable-speed switch (i.e., the voltage across the switch is dependent upon the switch position). Additionally or alternatively, the trigger switch 38 may be a joystick, a hall-effect pushbutton or any other device known to a person having ordinary skill in the art and which is capable of performing the function as stated. The handheld controller 30 is configured to transmit operational commands to the command center 24 to operate the various axes. In operation, it is preferable that both an axis switch 32, 34, 36 and the trigger 38 be engaged in order for the chosen operation to commence; however, this is not necessary.

According to the present invention, the command center 24 preferably receives an input (preferably an electrical signal) associated with the operation of an axis of a hydraulically controlled apparatus, and the command center 24 outputs a variable current to the hydraulic pump 10 based on the input received by the command center 24. It is also contemplated that the voltage to the hydraulic pump 10 may be varied, alone or in combination with a variable current, to increase or decrease the amount of hydraulic pressure produced by the hydraulic pump 10, within the acceptable operable characteristics of the hydraulic pump 10; however, the exemplary embodiment providing a variable current will be described herein for simplification.

The input received by the command center 24 preferably contains information directed to the axis to be operated and the amount of hydraulic pressure to be output from the hydraulic pump 10. The hydraulic pressure from the pump 10 is preferably directly related to the current output from the command center 24, which is dictated by the input received by the command center 24. In other words, variation in the input received by the command center 24 alters the current output by the command center 24 and the hydraulic pressure produced by the pump 10.

Additionally, or alternatively, the hydraulic system 10 is configured to be customizable. For example, the ramp rate (i.e., the rate at which the command center 24 changes current output from a first selected current output to a second selected current output after receiving input from the trigger switch 38), the minimum current output delivered to the pump 12 by the command center 24, and the maximum current output delivered to the pump 12 by the command center 24.

The ramping feature decreases the impact to the hydraulic and battery systems typically associated with the activation of directional valves. When a battery is outputting the optimal power output and engages the pump at 100% of that output, the result is sudden "bang" within the hydraulic system. Ramping reduces this impact because not all of the optimal power output is provided instantaneously, instead the power is gradually increased or decreased over a predetermined time period.

Additionally or alternatively, it is contemplated that the hydraulic system 10 is customizable as discussed herein through an application operable on an electronic device, such as a cellular phone, other personal electronic device, and/or a computer. The operational characteristics (e.g., minimum and maximum current output and ramp rate) may be viewed and modified through a graphic user interface provided on a display of the electronic device and communicated to the command center 24 via a wireless network or BLUETOOTH® communication, other wireless technology now known or later developed, and/or through a hard-wire connection.

An exemplary method of operating the extension 122 of the boom 120, according to the present invention is herein described. In this provided scenario, the first axis switch 32 is assigned to operate the first directional valve 14, which is operatively connected to the boom 120 and configured to extend 122 and retract 124 the boom 120 depending on the flow of the hydraulic fluid (not shown) through the first directional valve 14.

The first axis switch 32 is preferably a two-way momentary switch as stated above and therefore is configured to close a first circuit when maintained in the first position and to close a second circuit when maintained in the second position. The closing of the first circuit opens a pathway (not shown) in the first directional valve 14 to allow hydraulic fluid to pass through in a first direction to extend 122 the boom 120. The closing of the second circuit opens a pathway (not shown) in the first directional valve 14 to allow hydraulic fluid to pass through in a second direction to retract 124 the boom 120.

As provided above, the operation of any of the axes may be a two-part procedure requiring activation of at least one of the axis switches 32, 34, 36 and activation of the trigger switch 38 and an exemplary method of use follows, but it should be noted that the method may be performed through the operation of a single switch incorporating the features herein described. With that said, according to the exemplary embodiment shown herein, to extend the boom 120 the first axis switch 32 is retained in the first position, and with the first axis switch 32 retained in the first position, the trigger switch 38 is activated. The handheld controller 30 transmits to the command center 24 that the first axis switch 32 is in the first position and also transmits the position of the trigger switch 38. The command center 24 opens a pathway in the first directional valve 14 to allow hydraulic fluid (not shown) to flow in the direction required to extend 122 the boom 120. The command center 24 also outputs an amount of current to the hydraulic pump 12 in the proportion dictated by the position of the trigger switch 38. The hydraulic system 10 is preferably configured to supply current in a range from about 0% to about 100% of the available current capacity from the battery 20.

Continuing in the method example, when the second axis switch 34 is activated to simultaneously operate another axis (for example to raise 126 the boom 120) along with the extension 122 of the boom 120 activated by the first axis switch 32, the hydraulic pressure provided by the pump 12 is preferably divided substantially equally among the two axis operations. If, at the time of the activation of the second axis, the trigger switch 38 is maintained in the pre-second-axis-activation position, the speed of the first axis operation (extending 122 the boom 120) is halved because the command center 24 is outputting a predetermined amount of current to the pump 10 dependent upon the position of the trigger switch 38.

If the trigger switch 38 is not in a position in which the command center 24 is outputting 100% (or the preset maximum output) of the current capacity of the battery 20 to the pump 12 at the time of activating the second axis, the current to the pump 12 may be increased to increase the hydraulic pressure in the hydraulic system 10 by moving the trigger switch 38 in the direction corresponding to providing more current to the pump 12. For example, if the pre-second-axis-activation position of the trigger switch 38 is positioned to provide 50% of the potential output current to the pump 12 as directed by the command center 24, after the activation of the second axis, the trigger switch 38 may be re-positioned to provide more than 50%, for example 100%, of the current output to the pump 12 as directed by the command center 24. When 100% of the output current (i.e., double the original output current) is demanded, the hydraulic pressure is increased to each of the two operating axes. In this example, this means that the hydraulic pressure now provided to extend 122 the boom 120 (i.e., the speed of the extension operation 122), is the same as it was prior to the activation of the second axis operation.

Further, if the third axis switch 36 is also activated, the hydraulic pressure is preferably divided substantially equally among the three axis operations. The same hydraulic pressure distribution is preferably true for any additional activated axes.

Figure 4:
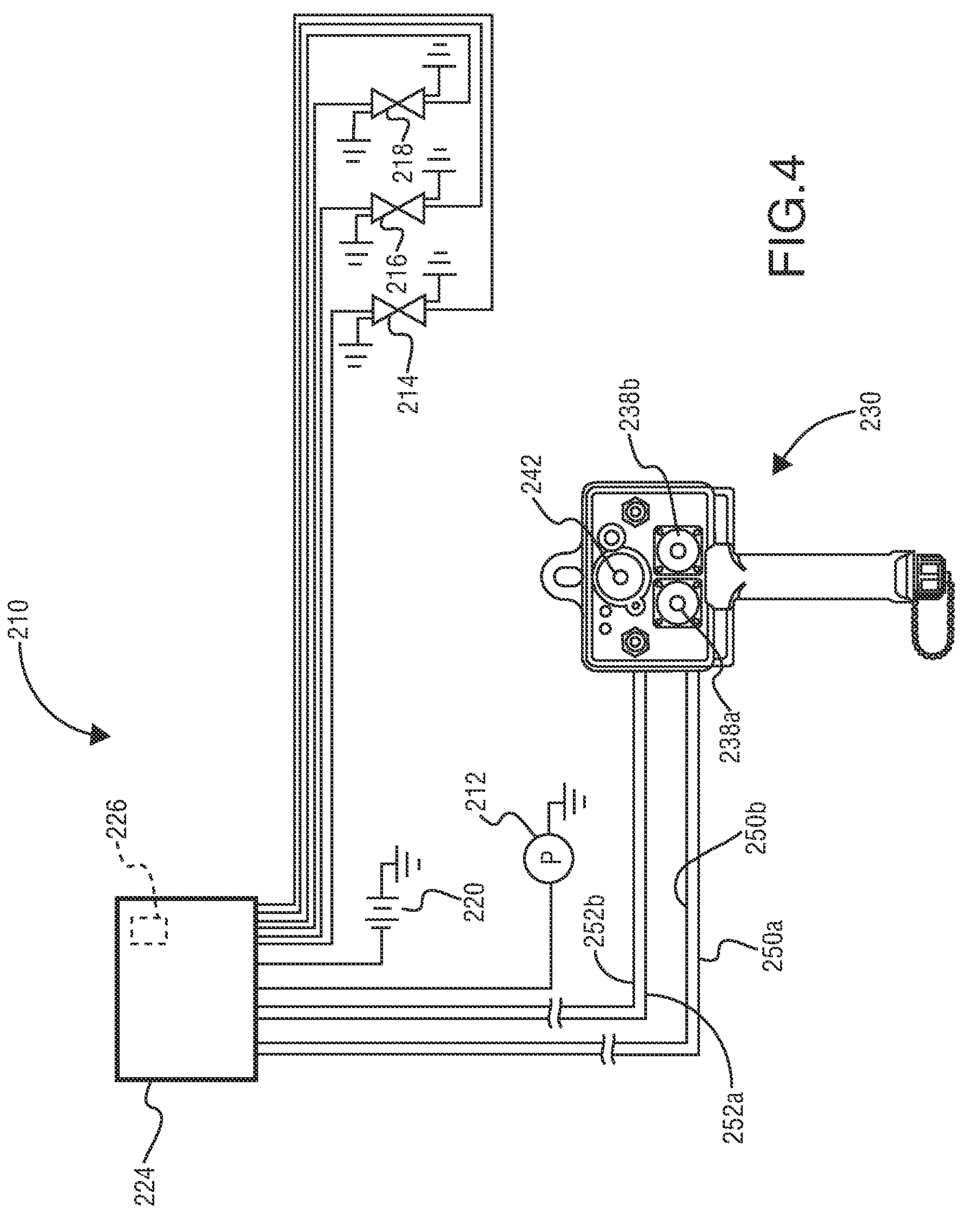
FIG. 4 is an electrical schematic of a second embodiment of the hydraulic system according to the present invention.

Moving now to FIG. 4, an electrical schematic of a second embodiment 210 of a hydraulic system may be seen. This embodiment comprises nearly the same makeup as the first embodiment, such that like numberings indicate at least substantially similar operation. However, the second embodiment of the hydraulic system 210 comprises a handheld controller 230 comprising at least one, but preferably two joysticks 238, a first joystick **238*a* and a second joystick 238*b*, and lacking independent axis selection switches. Both the joysticks 238*a*, 238*b* preferably may be moved from a center, or home, position, to which they are biased absent external forces on them. Each joystick 238*a*, 238*b* is in electronic communication with the command center 224, which may be wireless, but preferably via wired connections 250/252, wherein each connection 250/252 corresponds to, reflects, or is indicative of movement of one of the joysticks 238 about one axis of movement. The controller 230 also preferably comprises an emergency stop, or kill, switch 242, configured to cease or pause operation of the hydraulic system 210. The emergency stop switch 242 is preferably in the form of a push button. Transmittal of the joystick position from the controller 230 to the command center 224** may be provided via any now known or later developed wireless communication technology (e.g., BLUETOOTH® communication, radio frequency signals, wireless local area network communication, infrared communication, near field communications (NFC), etc.).

Figure 5:
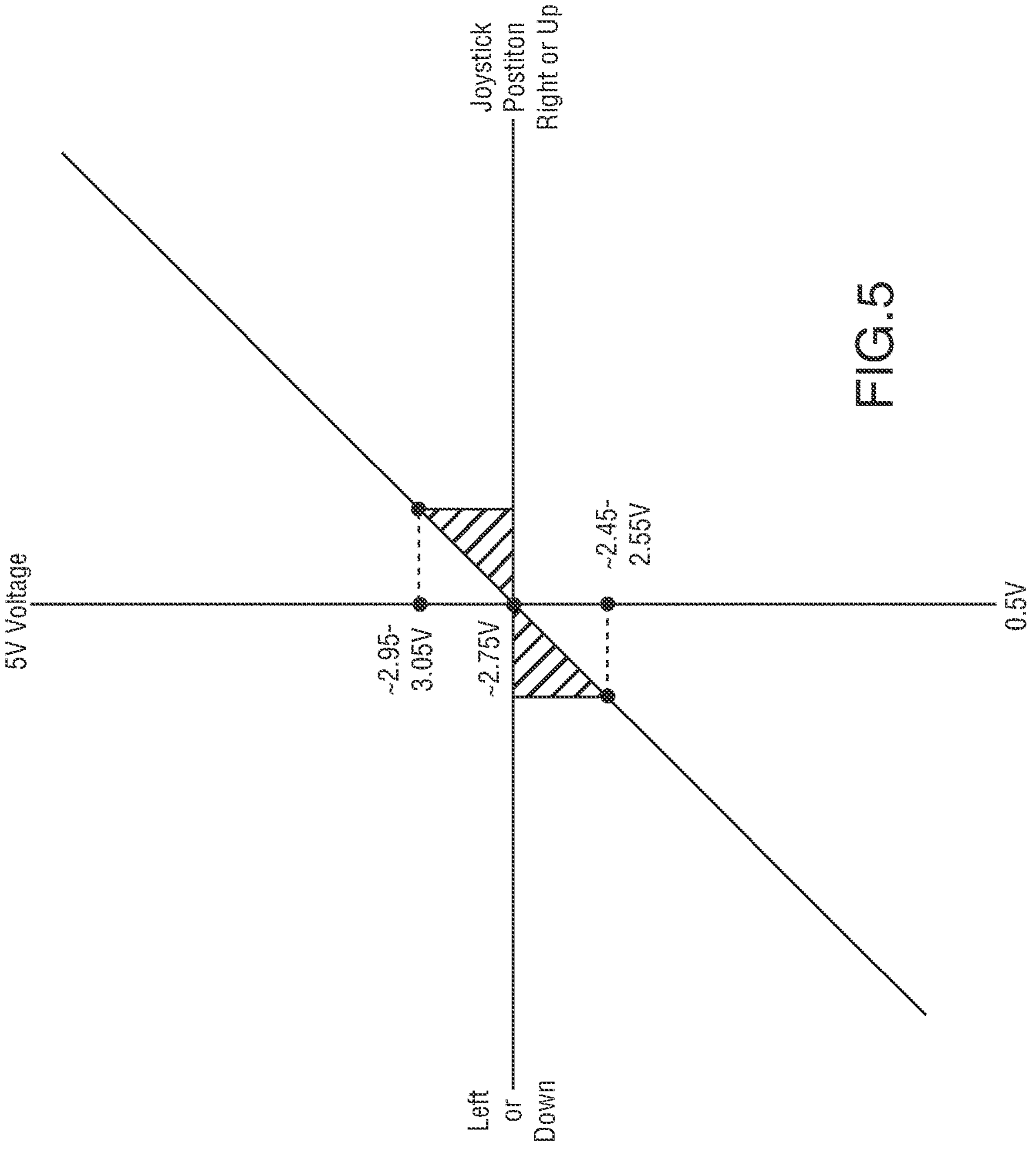
FIG. 5 is a graph of a relationship of output voltage from a controller according to the present invention relative to a joystick position along a single axis of movement.

The movement of a first joystick **238*a* about a first rotational axis adjusts voltage transmitted to the command center 224 by a first wired connection 250*a*. The movement of the first joystick 238*a* about a second rotational axis (preferably orthogonal to the first) adjusts voltage transmitted to the command center 224 by a second wired connection 250*b*. The movement of a second joystick 238*b* about a first rotational axis adjusts voltage transmitted to the command center 224 by a third wired connection 252*a*. The movement of the second joystick 238*b* about a second rotational axis (preferably orthogonal to the first) adjusts voltage transmitted to the command center 224 by a fourth wired connection 252*b*. Movement of each joystick 238 about or along each rotational axis varies output voltage (provided on the wired connections 250/252) within a predetermined range, such as about 0.5 volts and 5 volts, with about 2.75 volts being provided when the controller 230 is powered on and the joysticks 238 are at their respective home positions. Joystick position is preferably directly linearly related to voltage output as shown in FIG. 5, and each joystick moves about or along two axes. For example, when the first joystick is positioned to its farthest possible left position, about 0.5 volts is transmitted to or sensed by the command center 224 on the first wired connection 250*a*. When the joystick 238*a* is at its farthest possible right position, about 5.0 volts is transmitted to or sensed by the command center 224 on the first wired connection 250*a*. When a joystick is idle (i.e. at the center of the two-axis plane), the controller is transmitting 2.75 volts to the command center 224, or the command center 224 senses same. The command center 224 receives or senses the voltage on the connections 250/252 and recognizes which joystick 238 has been moved, how much it has been moved, and along or about which axis of movement it was moved, based on the voltage provided on the respective wired connections 250/252. Based on the communications from the controller 230, the command center 224 then activates the corresponding directional valve(s) 214/216/218 in a predetermined direction and adjusts DC voltage to the DC pump 212** to control hydraulic pressure in the system.

To reduce the chance of operation by accidental contact with a joystick **238*a*, 238*b*, the command center 224 preferably prevents activation of a corresponding directional valve 214-218 until the joystick travels a predetermined minimum distance from center, as reflected by, e.g., the voltage provided on the communication lines 250/252. In other words, there is preferably a zone of inactivity about home position, represented by the shaded regions in FIG. 5. This inactivity zone corresponds to a range of joystick positions providing an output voltage that varies from the home position voltage by about 0.18 to about 0.32 volts, and more preferably between 0.2 and 0.3 volts. This means that when the command center 224 receives or senses voltage on a line 250/252 between approximately 2.95 volts and about 3.05 volts, at maximum inactivity range (and between about 2.45 volts and about 2.55 volts at minimum inactivity range), the command center will not activate the respective directional valve 214-218 (or other hydraulic device) associated with the respective joystick axis. Preferably, then, only once a joystick 238 has moved to a position along an axis that corresponds to an output voltage above or below that range, in any direction, will the command center 224 activate the necessary directional valve and vary the hydraulic pressure according to the transmitted or sensed voltage. Alternate embodiments of the present invention may allow the inactivity range to be programmable into the command center 224**, allowing for a wider or narrower inactivity range as the user sees fit.

The voltage communicated to or sensed by the command center 224 has two functions. First, the command center 224 recognizes which axis connection is transmitting a measurement to determine which directional valve 214-218 to activate. Each directional valve 214-218 is a bi-directional, on/off valve. Once the joystick 238*a*, 238*b* moves along an axis past the zone of inactivity, the command center 224 recognizes the axis of movement and activates the corresponding valve 214-218.

Second, voltage relates to a proportional (preferably directly or averaged) increase or decrease of the pressure output of the pump 212, preferably increasing the pressure output the further the joystick is moved away from the home position. For example, when a joystick 238*a*, 238*b* is moved away from the home position (and preferably out of the inactivity zone), the command center 224 causes an increase in the hydraulic pressure output by the pump 212. Alternatively, when the joystick is moved towards the home position, the command center 224 decreases the pressure output by the pump 212. At idle, the joystick is not moving, thus the pressure is held at a minimum value but none of the valves 214-218 are activated.

The hydraulic system 210 may also allow for diagonal joystick movements as well (i.e. the joystick moves along both axes at once). The command center 224 receives or senses the voltage from two connections associated with a single joystick (250*a,b* or 252*a,b*) and may activate multiple (e.g., two) respective directional valves, and may average the two voltages or may provide preference to a particular axis.

For instance, as stated above, the hydraulic system 210 preferably includes two joysticks 238*a*,238*b*, each capable of movement along and between two axes. However, the system 210 generally preferably includes a single pump 212. If both joysticks are moved outside of their inactivity zones, then more than one directional valve will be activated, and the pump pressure will be provided to and through all activated valves. Accordingly, the command center 224 may be sent or may sense a plurality of voltage levels, each on one of the communication lines 250/252. Instead of adjusting the pump control voltage in direct response to a variation of voltage on only a single communication line, the command center 224 preferably includes either an averaging or preferential (ranked) operation, or a combination thereof, in the event of both joysticks moving outside of their inactivity zones (or a single joystick moving along two axes). In an averaging operation, the operating voltage for the DC pump may be a voltage level that is averaged (relative to the home voltage) from all active lines 250/252. For instance, if a first joystick 238*a* provides a voltage of 2 volts on line 250*a* and 3.5 volts on line 250*b*, and the second joystick is within its inactivity zone, then a pump voltage, to be sent from the command center 224 to the pump 212 could be calculated as follows:

$$\text{Pump Voltage} = \frac{PV_{max} * \sum |(JV_{home} - JV_{active})|}{JV_{num}(JV_{max} - JV_{home})}$$

Where $PV_{max}$=maximum DC voltage to operate DC pump, which may be programmable in the command center 224.

The sum (Σ) of absolute values of the difference of $JV_{home}$–$JV_{active}$ is then calculated for each joystick outside of its inactivity zone and multiplied by $PV_{max}$, where $JV_{home}$=voltage while joystick in home position; and $JV_{active}$=voltage of joystick outside of inactivity zone.

That product is then divided by a product of $JV_{num}$ and the difference of $JV_{max}$–$JV_{home}$, where $JV_{num}$=number of joysticks outside of their inactivity zone;

$JV_{max}$=maximum voltage to be provided by or sensed from a joystick communication line 250/252.

Additionally or alternatively, a preferential or prioritized operation may be utilized. For example, the command center 224 may be programmed to recognize a sudden or urgent joystick position change to prioritize that direction/axis over others, utilizing the related and respective communication line 250/252 to substantially influence the control of the pump 212. Another preferential or prioritized operation example may be to program the command center 224 to always prioritize a specific joystick 238*a* or 238*b* and/or joystick connection 250*a*, 250*b*, 252*a*, or 252*b*, or some combination thereof, such that the command center 224 will utilize such prioritized communications in controlling the directional valves 214-218 and pump 212.

Alternate embodiments of the hydraulic system 210 may feature multiple pumps 212, wherein the DC control voltage for each pump is controlled in response to output from an individual joystick 238*a* or 238*b*, or other trigger or potentiometer. Other embodiments may feature additional directional valves and corresponding trigger switches, leading to further fail-safes and/or additional pumps. Alternate embodiments may also feature trigger switch(es) 238 with only one axis of movement, such as a rotational potentiometer, a paddle switch, or a push button potentiometer.

In all other aspects not mentioned, the second embodiment of the hydraulic system 210 comprises substantially the same parts and operates in substantially the same manner as the first embodiment of the hydraulic system 10.

The foregoing is considered as illustrative only of the principles of the invention. Furthermore, because numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A handheld controller for operating a hydraulic system including a first, second, and third axis of operation, a battery with a battery output, and a direct current (DC) hydraulic pump, the handheld controller comprising:

a first joystick configured to control the battery output to the DC hydraulic pump, the first axis of operation of the hydraulic system, and the second axis of operation of the hydraulic system; and a second joystick configured to control the battery output to the DC hydraulic pump and the third axis of operation of the hydraulic system, wherein each joystick is positionable along two axes of movement, each axis corresponding to a maximum of one directional valve of the hydraulic system, each joystick biased to a central home position, wherein a predetermined movement of either joystick activates the directional valve associated with that joystick, wherein movement of either joystick further from the central home position beyond the predetermined movement increases the hydraulic pressure of the hydraulic system, and wherein movement of a joystick from a resting position for a predetermined range about one axis will not vary the hydraulic pressure nor activate the associated directional valve.

2. A hydraulic system comprising:

a machine with at least two axes of operation;

at least two directional valves, wherein each directional valve is operatively connected to an axis of operation;

a direct current (DC) hydraulic pump operatively connected to the directional valves;

a handheld controller comprising at least two bi-directional joysticks;

a battery with a battery output; and a command center in electrical communication with the hydraulic pump, the handheld controller, and the battery;

wherein the handheld controller communicates with the command center to operate the directional valves and adjust the battery output to the hydraulic pump, wherein movement of a joystick about a single axis corresponds to the operation of one directional valve and effects a variation in the battery output, and wherein the battery output provided to the pump is within a predetermined range and is affected by at least one of movement of a first of the joysticks in a first direction; movement of the first joystick in a second direction, the second direction being orthogonal to the first direction; and movement of the first joystick in a third direction, the third direction being between the first direction and the second direction.

3. The hydraulic system according to claim 2, wherein the handheld controller communicates with the command center wirelessly.

4. The hydraulic system according to claim 2, wherein movement of the first joystick in the third direction causes the command center to generate and deliver an adjusted battery output to the pump.

5. The hydraulic system according to claim 2, wherein the battery output provided to the pump is also affected by at least one of movement of a second of the joysticks in a first direction; movement of the second joystick in a second direction, the second direction being orthogonal to the first direction; and movement of the second joystick in a third direction, the third direction being between the first direction and the second direction.

* * * * *